United States Patent
Kamata et al.

(12)

(10) Patent No.: US 6,894,125 B2
(45) Date of Patent: May 17, 2005

(54) SCALE DEPOSIT INHIBITOR, PROCESS FOR ITS PRODUCTION, POLYMERIZER WHOSE INSIDE WALL IS COVERED WITH THE INHIBITOR, AND PROCESS FOR PRODUCTION OF VINYLIC POLYMERS BY THE USE OF THE POLYMERIZER

(75) Inventors: Kunio Kamata, Tokuyama (JP); Kazuhiko Kanawa, Tokuyama (JP); Kikuo Yamamoto, Tokuyama (JP)

(73) Assignee: Tokuyama Corporation, Tokuyama (JP)

(*) Notice: Subject to any disclaimer, the term of this patent is extended or adjusted under 35 U.S.C. 154(b) by 68 days.

(21) Appl. No.: 10/467,807

(22) PCT Filed: Dec. 12, 2001

(86) PCT No.: PCT/JP01/10897

§ 371 (c)(1),
(2), (4) Date: Aug. 12, 2003

(87) PCT Pub. No.: WO03/050145

PCT Pub. Date: Jun. 19, 2003

(65) Prior Publication Data

US 2004/0077804 A1 Apr. 22, 2004

(51) Int. Cl.⁷ .................................................. C08F 2/04
(52) U.S. Cl. .......................... 526/62; 422/129; 525/32
(58) Field of Search ........................... 526/62; 422/129; 525/32

(56) References Cited

U.S. PATENT DOCUMENTS 6,022,932 A * 2/2000 Ooura et al. ................. 526/62

FOREIGN PATENT DOCUMENTS

EP          1108727 A     12/2000
JP         51-103883 A     9/1976
JP          62-3841 B2     1/1987
JP         62-201832 A     9/1987
JP          1-31523 B2     6/1989
JP         10-60008 A      3/1998
JP         10-231302 A     9/1998
JP       2001-354707 A    12/2001
WO        WO 98/24820 A1   6/1998

* cited by examiner

Primary Examiner—William K. Cheung
(74) Attorney, Agent, or Firm—Birch, Stewart, Kolasch & Birch, LLP

(57) ABSTRACT

A scale adhesion preventing agent for use in a polymerization reactor, consisting essentially of a condensate of a phenol represented by the following formula (1), a 1-naphthol and an aldehyde, which is soluble in an alkaline aqueous solution:

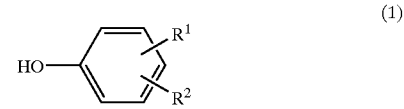

(1)

wherein $R^1$ and $R^2$ are the same or different and each a hydroxyl group, alkyl group having 1 to 8 carbon atoms, halogen atom, hydrogen atom, alkoxycarbonyl group whose alkyl moiety has 1 to 8 carbon atoms or phenyl group, with the proviso that a hydrogen atom is existent at at least two of ortho-positions and para-positions with respect to the hydroxyl group.

When a vinyl-based monomer is to be polymerized using a polymerization reactor having a film of this scale adhesion preventing agent on the inner wall, the vinyl-based polymer can be produced by preventing the adhesion of a scale.

8 Claims, No Drawings

SCALE DEPOSIT INHIBITOR, PROCESS FOR ITS PRODUCTION, POLYMERIZER WHOSE INSIDE WALL IS COVERED WITH THE INHIBITOR, AND PROCESS FOR PRODUCTION OF VINYLIC POLYMERS BY THE USE OF THE POLYMERIZER

This application is the national phase under 35 U.S.C. § 371 of PCT International Application No. PCT/JP01/10897 which has an International filing date of Dec. 12, 2001, which designated the United States of America.

FIELD OF THE INVENTION

The present invention relates to an agent for preventing the adhesion of a scale produced during the polymerization reaction of a vinyl monomer such as styrene, vinyl acetate, vinyl chloride, styrene-acrylonitrile or styrene-butadiene by suspension polymerization or emulsion polymerization to the inner wall of a polymerization reactor, a production process therefor, a polymerization reactor having the agent applied to the inner wall and a process for producing a vinyl-based polymer using this polymerization reactor.

Specifically, it relates to an agent for preventing the adhesion of a scale produced during the production of a vinyl chloride-based polymer to the inner wall of a polymerization reactor.

DESCRIPTION OF THE PRIOR ART

In the production of a polymer by the suspension polymerization or emulsion polymerization of a vinyl monomer such as styrene or vinyl chloride, the polymer of the monomer is adhered to the inner wall of a polymerization reactor, a stirrer, a heat exchanger and other elements existent in the polymerization reactor (all of them will be simply referred to as "inner wall of a polymerization reactor" hereinafter) as a scale, thereby reducing the heat exchange efficiency, or the scale falls off from the inner wall and gets mixed in the polymer product, thereby deteriorating the quality of the product. Therefore, to prevent the adhesion of the scale to the inner wall of the polymerization reactor, a substance for preventing a scale from adhering to the inner wall of the polymerization reactor (scale adhesion preventing agent) is coated on the inner wall of the polymerization reactor in the form of a thin film. As the scale adhesion preventing agent used for this purpose is proposed a condensate of a phenol and an aldehyde (JP-A 62-201832) (the term "JP-A" as used herein means an "unexamined published Japanese patent application"), a self-condensate of a polyphenol or a polynaphthol (JP-B 62-3841) (the term "JP-B" as used herein means an "examined Japanese patent publication") and a condensate of 1-naphthol and formaldehyde (JP-B 1-31523). However, these scale adhesion preventing agents are unsatisfactory in terms of adhesion preventing effect or cannot retain their adhesion preventing effect for a long time though they have an adhesion preventing effect. Therefore, they cannot be used for a plurality of polymerization operations.

Further, a condensate of an aldehyde, phenol compound and aromatic carboxylic acid having a hydroxyl group introduced into the aromatic nucleus (WO98/24820) is proposed as a scale adhesion preventing agent which can retain its scale adhesion preventing effect for a longer time than the above scale adhesion preventing agents. However, the scale adhesion preventing agent which contains a relatively strong acid group such as sulfonic acid group or carboxylic acid group, or a basic group such as amino group or imino group has a relatively large influence upon the color of a molded product of a vinyl-based polymer.

That is, conventionally proposed scale adhesion preventing agents have various problems, which their scale adhesion preventing effect is unsatisfactory, which the effect cannot be retained for a long time, and which they fall off from the inner wall of a polymerization reactor and get mixed in a product polymer, thereby deteriorating the quality of the product. Consequently, the development of a more preferred scale adhesion preventing agent is desired.

OBJECT OF THE INVENTION

It is an object of the present invention to provide a novel scale adhesion preventing agent for preventing the adhesion of a scale to a polymerization reactor during the suspension polymerization or emulsion polymerization of a vinyl-based monomer.

It is another object of the present invention to provide a scale adhesion preventing agent which can retain its large scale adhesion preventing effect for a long time during the suspension polymerization or emulsion polymerization of a vinyl-based monomer.

It is still another object of the present invention to provide a process for producing the scale adhesion preventing agent of the present invention.

It is a further object of the present invention to provide a polymerization reactor having a film of the above scale adhesion preventing agent on the inner wall.

It is a still further object of the present invention to provide a process for producing a vinyl-based polymer using a polymerization reactor having a film of the above scale adhesion preventing agent on the inner wall.

Other objects and advantages of the present invention will become apparent from the following description.

SUMMARY OF THE INVENTION

The inventors of the present invention have conducted various studies to attain the above objects and have found that when a condensation product soluble in an alkaline aqueous solution, which is obtained by a condensation reaction among a phenol, a 1-naphthol and an aldehyde, is applied to the inner wall of a polymerization reactor before the suspension polymerization or emulsion polymerization of a vinyl-based monomer, particularly a vinyl chloride monomer, it produces an excellent scale adhesion preventing effect, hardly exerts a bad influence upon the color of a molded product of the obtained vinyl-based polymer and hardly causes a fish eye in the polymer. The present invention has been accomplished based on this finding.

That is, the present invention is a scale adhesion preventing agent consisting essentially of a condensate of a phenol represented by the following formula (1) (to be simply referred to as "phenol" hereinafter), a 1-naphthol and an aldehyde, which is soluble in an alkaline aqueous solution:

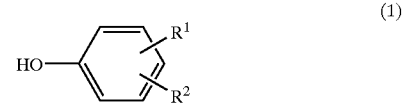

(1)

wherein $R^1$ and $R^2$ are the same or different and each a hydroxyl group, alkyl group having 1 to 8 carbon atoms, halogen atom, hydrogen atom, alkoxycarbonyl group whose alkyl moiety has 1 to 8 carbon atoms or phenyl group, with the proviso that a hydrogen atom is existent at at least two of ortho-positions and para-positions with respect to the hydroxyl group.

In the present invention, it is important that the above phenol should not have a strong acid group such as sulfonic acid group or carboxylic acid group, or a base such as amino group or ammonium group. That is, when a phenol having the above substituent is used, it produces an unfavorable effect such as coloration on a vinyl-based polymer, particularly a vinyl chloride-based polymer.

The phenol used in the present invention is preferably a compound selected from the group consisting of monophenols such as phenol, o-cresol, p-cresol, p-t-butylphenol, o-t-butylphenol, m-chlorophenol and methyl salicylate; diphenols such as catechol, resorcinol, 2-methylresorcinol and hydroquinone; triphenols such as pyrogallol, phloroglucinol and hydroxyhydroquinone; and biphenyls such as o-hydroxybiphenyl, p-hydroxybiphenol and 2,4-dihydroxybiphenyl, or a mixture of two or more thereof. Out of these, a diphenol or triphenol can be advantageously used because they have an excellent scale adhesion preventing effect. Out of these, catechol is particularly preferred.

The 1-naphthol which can be advantageously used in the present invention is a compound represented by the following formula (2):

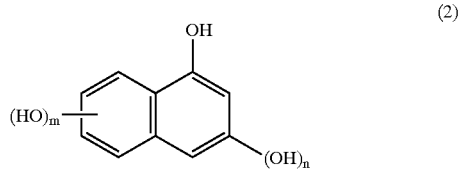

(2)

wherein m is 0 or 1 to 3, and n is 0 or 1.

Examples of the 1-naphthol include dihydroxynaphthalenes such as 1-naphthol, 1,3-dihydroxynaphthalene, 1,5-dihydroxynaphthalene, 1,6-dihydroxynaphthalene and 1,8-dihydroxynaphthalene; trihydroxynaphthalenes such as 1,3,5-trihydroxynaphthalene, 1,3,6-trihydroxynaphthalene and 1,5,7-trihydroxynaphthalene; and tetrahydroxynaphthalenes such as 1,5,7,8-tetrahydroxynaphthalene.

These compounds may be used alone or as a mixture of two or more. The 1-naphthol may have a substituent other than a group which is dissociated in water as an ion, such as alkyl group or halogen atom, at a position other than the 2-position and 4-position of a nucleus.

The 1-naphthol is preferably 1-naphthol.

The aldehyde advantageously used in the present invention is formaldehyde, acetaldehyde, propionaldehyde, benzaldehyde or furfural. Scale adhesion preventing agents obtained by using formaldehyde and acetaldehyde have excellent adhesion preventing capability and can achieve high compatibility with a vinyl-based polymer, particularly a vinyl chloride-based polymer by suitably selecting the amounts of a phenol and a 1-naphthol to be condensed therewith. Therefore, even when the film of the scale adhesion preventing agent falls off from the inner wall of a polymerization reactor and gets mixed in a product polymer during the polymerization of a vinyl-based monomer, it hardly becomes the cause of the coloration of the polymer or a noncompatible foreign substance. Out of these, formaldehyde is particularly preferred because it retains a scale adhesion prevention effect for a long time. In this case, formaldehyde or acetaldehyde may be used alone or in combination with another aldehyde. When it is used in combination with another aldehyde, formaldehyde or acetaldehyde is used in an amount of preferably 10 mol % or more, more preferably 40 mol % or more based on the total of all aldehydes.

When benzaldehyde is used as the aldehyde in the present invention, a scale adhesion preventing agent which can retain its effect for a long time can be obtained. Therefore, in order to obtain a scale adhesion preventing agent which can retain its effect for a long time, benzaldehyde is preferably used. When benzaldehyde is used, it is used in an amount of preferably 10 mol % or more, more preferably 70 mol % or more based on the total of all aldehydes. Otherwise, a satisfactory effect is hardly obtained.

The present invention is a scale adhesion preventing agent which consists essentially of a co-condensate of the above phenol, 1-naphthol and aldehyde and totally differs from a condensate of a phenol and an aldehyde and/or a condensate of a 1-naphthol and an aldehyde. That is, when a condensate of a phenol and an aldehyde and a condensate of a 1-naphthol and an aldehyde are mixed together, the scale adhesion preventing effect of the resulting mixture is small, or the amount of a colored foreign substance contained in a molded product of a vinyl-based polymer increases.

In the present invention, the ratio of the above phenol, 1-naphthol and aldehyde is not particularly limited but the phenol is used in an amount of preferably 0.01 to 2 mols, more preferably 0.3 to 0.8 mol based on 1 mol of the 1-naphthol. That is, when the amount of the phenol is smaller than 0.01 mol, the amount of a colored foreign substance contained in the vinyl-based polymer or the number of fish eyes tends to increase. When the amount of the phenol is larger than 2 mols, the scale adhesion preventing effect tends to decrease.

The amount of the aldehyde is generally 0.2 mol or more, preferably 0.5 to 2 mols, more preferably 0.6 to 1.2 mols based on 1 mol of the total of the phenol and 1-naphthol. That is, when the amount of the aldehyde is larger than 2 mols, a crosslinking reaction between the phenol and the 1-naphthol proceeds, whereby a condensate insoluble in an alkaline aqueous solution is readily formed. When the amount of the aldehyde is smaller than 0.2 mol, a condensation reaction hardly proceeds completely, whereby the scale adhesion preventing effect tends to decrease.

One of particularly preferred embodiments of the present invention is a scale adhesion preventing agent obtained by co-condensing a diphenol or triphenol, particularly catechol as the phenol, 1-naphthol as the 1-naphthol and formaldehyde or acetaldehyde as the aldehyde in the above ratio. This scale adhesion preventing agent has a large scale adhesion preventing effect and extremely high compatibility with a vinyl-based polymer. A colored foreign substance or fish eye is rarely seen in a molded product of a vinyl polymer obtained by polymerization using a polymerization reactor having a film of this scale adhesion preventing agent on the inner wall.

In the present invention, the method of carrying out a condensation reaction among a phenol, 1-naphthol and aldehyde is not particularly limited. Conventional means of obtaining a precursor of a phenol resin, such as resol, resitol or novolak is used. For instance, when a solvent is used, water, an organic solvent or a mixture thereof is used and when a catalyst is used, a basic catalyst such as sodium hydroxide or potassium hydroxide, or an acidic catalyst such as hydrochloric acid, phosphoric acid, acetic acid or oxalic acid is used.

The condensation reaction temperature is preferably from room temperature (25° C.) to 300° C., more preferably from 30 to 150° C. Particularly when the total process of the condensation reaction is carried out at substantially a constant temperature, a temperature range of 50 to 95° C. is used. The condensation reaction time is not particularly limited but preferably 2 minutes to 72 hours, more preferably 2 to 12 hours.

The condensation reaction product formed by the condensation reaction of the present invention is a mixture of condensates which differ from one another in raw material ratio and the degree of condensation, which may contain unreacted raw materials and is soluble in an alkaline aqueous solution. The reaction mixture may be used as a scale adhesion preventing agent directly or after impurities such as an unreacted product are removed by purification and further the solvent is removed or reduced by distillation or the like, or the solvent is added to dilute the mixture as required.

Although the scale adhesion preventing agent of the present invention can be prepared as a solid by completely removing the solvent, it is provided as a solution (or suspension) having a concentration of preferably 50 wt % or less, more preferably 0.2 to 10 wt %.

In the particularly preferred condensation method in the present invention, a phenol, 1-naphthol and aldehyde are mixed together in an aqueous solvent in the presence of a basic catalyst such as sodium hydroxide, potassium hydroxide or ammonia at 80° C. or less, the temperature of the mixture is elevated slowly to preferably 90 to 150° C., more preferably 95 to 110° C. at a rate of preferably 2° C./min or less, more preferably 1° C./min or less, and optionally a reaction is continued at the above temperature range for preferably 2 minutes to 72 hours, more preferably 1 to 10 hours, much more preferably 3 to 8 hours.

That is, the condensation reaction is caused to proceed mildly at a relatively low temperature in the initial stage and completed at a relatively high temperature in the end so that at the time of its use, that is, when the obtained scale adhesion preventing agent is applied to the inner wall of a polymerization reactor for a vinyl-based monomer, the formed film has high uniformity, high adhesion to the inner wall, particularly stainless steel inner wall of a polymerization reactor and a large scale adhesion preventing effect and can retain this effect for a long time.

When the condensation reaction is carried out at a high temperature from the initial stage of condensation or by rapidly increasing the temperature, the condensation reaction proceeds rapidly, thereby forming a heterogeneous condensate. When this heterogeneous condensate is used as a scale adhesion preventing agent, the amount of a colored foreign substance contained in the vinyl-based polymer tends to increase.

However, when the condensation reaction is carried out at a too low temperature, it proceeds too slowly. Therefore, it is preferred to mix together a phenol, 1-naphthol and aldehyde at a temperature of preferably 50 to 80° C., more preferably 65 to 75° C. and carry out a reaction at an increased temperature from industrial view.

When the condensation reaction is not completed at a temperature of 90° C. or more, the condensation reaction does not proceed completely and when the obtained condensation product is used as a scale adhesion preventing agent, its scale adhesion preventing effect is low. When the condensation reaction is completed at a high temperature, for example, 150° C., particularly more than 300° C., the obtained scale adhesion preventing agent tends to cause a colored foreign substance and a large number of fish eyes in the vinyl-based polymer.

To produce the scale adhesion preventing agent of the present invention, the order of mixing components to be subjected to the condensation reaction is not particularly limited but it is recommended to add a phenol, 1-naphthol and basic catalyst to an aqueous solvent and then add an aldehyde to the resulting solution gradually.

As the aqueous solvent is generally used water alone. However, to shorten the drying time after the application of the obtained scale adhesion preventing agent, an organic solvent having compatibility with water, such as methanol or ethanol, may be used in an amount of 30 wt % or less in limits that do not deteriorate the dispersibility (or solubility) of the condensation product. After the completion of the condensation reaction, the reaction product is used as a scale adhesion preventing agent directly or after it is purified and further concentrated or diluted as described above. Since the condensation reaction product is soluble in an alkaline aqueous solution, it is preferably prepared as an aqueous solution having a pH of 8 to 13.5.

Other substances may be further added to the scale adhesion preventing agent of the present invention in limits that do not prevent the scale adhesion preventing effect of the agent. The substances include a water-soluble polymer compound such as polyvinyl alcohol, partly saponified polyvinyl alcohol, methyl cellulose or sodium polyacrylate; anionic surfactant such as sodium dodecylsulfate; water-dispersible fine particles such as silica sol or alumina sol; and water-soluble alkali metal salt such as sodium carbonate, sodium silicate, sodium ascorbate, sodium citrate, sodium hydrogensulfite, sodium dithionite, sodium pyrophosphate, sodium hydrogenphosphate or potassium acetate.

The total amount of the above additives is preferably 30 wt % or less based on the condensate.

The scale adhesion preventing agent of the present invention can be applied to a polymerization reactor for the suspension polymerization or emulsion polymerization of a vinyl-based monomer.

The vinyl-based monomer is a vinyl monomer such as styrene, vinyl chloride, vinyl acetate or methyl (meth) acrylate, a mixture of two or more thereof, or a mixture thereof with another monomer copolymerizable with the above monomer or monomer mixture, such as vinylidene chloride, acrylonitrile, ethylene or butadiene. In the present invention, a vinyl chloride-based monomer, that is, vinyl chloride or a mixture of vinyl chloride and another monomer copolymerizable with vinyl chloride, such as vinyl acetate, ethylene, vinyliden chloride or acrylonitrile is particularly preferred.

The structure, material and the like of a polymerization reactor to be coated with the scale adhesion preventing agent of the present invention are not particularly limited. A known polymerization reactor is used. Examples of the polymerization reactor include metal polymerization reactors such as a stainless steel polymerization reactor, polymerization reactors lined with glass and glass polymerization reactors, including a stirrer, baffle and reflux cooler attached thereto.

The scale adhesion preventing agent of the present invention is applied to the inner wall of a polymerization reactor as uniformly as possible.

The application technique is not particularly limited but the scale adhesion preventing agent may be coated or sprayed. In the case of coating, a solution containing 0.2 to 10 wt % of the scale adhesion preventing agent is preferably applied by a brush or other similar coating tool, or caused to flow down over the inner wall of the polymerization reactor. In the case of spraying, a solution containing 0.2 to 10 wt % of the scale adhesion preventing agent is sprayed by a spray tool such as an ejector. The drive gas used for this purpose may be nitrogen or air and not particularly limited but steam is preferred. By using steam, the scale adhesion preventing agent to be sprayed is diluted to 10 to 1,000 times, thereby making it possible to form uniformly a thin film advantageously.

The scale adhesion preventing agent is applied to the inner wall of the polymerization reactor and dried to form a strong film. An excess of the scale adhesion preventing agent is removed by rinsing with water as required.

Therefore, according to the present invention, there is also provided a polymerization reactor which has a film of a scale adhesion preventing agent consisting essentially of a condensate obtained by condensing a phenol, a 1-naphthol and an aldehyde on the inner wall to produce a corresponding vinyl-based polymer by polymerizing a vinyl-based monomer, particularly a vinyl-based polymer by polymerizing a vinyl chloride-based monomer.

The thickness of the film of the condensate formed on the inner wall of the above polymerization reactor is not particularly limited but preferably 0.001 to 10 $g/m^2$ as the weight of the condensate.

According to the present invention, there is further provided a process for producing a vinyl-based polymer, comprising the step of carrying out the suspension polymerization or emulsion polymerization of a vinyl-based monomer using a polymerization reactor having a film of a condensate of a phenol, a 1-naphthol and an aldehyde on the inner wall. In this case, any known polymerization method may be used. That is, a known reaction initiator such as an organic peroxide exemplified by isopropyl peroxydicarbonate, lauroyl peroxide, tertiary butyl peroxypyvarate and benzoyl peroxide, an inorganic peroxide exemplified by potassium persulfate or azo-based compound exemplified by azobisbutyronitrile is used as a polymerization initiator. A redox catalyst which is a combination of a peroxide and a reducing agent is optionally used.

A dispersion stabilizer is generally used in suspension polymerization. Examples of the dispersion stabilizer include partly saponified polyvinyl alcohols and methyl celluloses.

An emulsion stabilizer is generally used in emulsion polymerization. Examples of the emulsion stabilizer include anionic surfactants such as sodium dodecylsulfate and nonionic surfactants such as polyoxyethylene lauryl ether.

Further, in polymerization of a vinyl chloride-based monomer, the molecular weight of the polymer may be optionally adjusted by using a mercapto-based compound such as ethyl mercaptan or a chlorine compound such as carbon tetrachloride as a chain transfer agent.

EXAMPLES

The following examples are provided for the purpose of further illustrating the present invention but are in no way to be taken as limiting.

In Examples, tests were carried out in accordance with the following methods.
(1) Scale Adhesion Prevention Properties The suspension polymerization and emulsion polymerization of vinyl chloride were carried out and evaluated.
(Suspension Polymerization)

28 kg of ion exchange water, 485 g of a 4 wt % aqueous solution of partly saponified polyvinyl alcohol (KH-20 of Nippon Gosei Co., Ltd.), 5.1 g of tertiary butyl peroxyneodecanoate as a radical initiator (KS-23 of Kayaku Akuzo Co., Ltd.) and 6.1 g of tertiary butyl peroxypyvarate (PS-N of NOF Corporation) were fed to a polymerization reactor (inner wall made from stainless steel) and then 18.65 kg of vinyl chloride monomer was fed to the reactor. Polymerization was carried out at 63.50° C. under agitation with three blue margin blades at 700 rpm for about 4 hours. After polymerization, a polymer and a water medium were taken out and the reactor was washed with water softly.

This operation was considered as one batch and the next charge was then fed to the reactor to carry out polymerization continuously. After three batches, a scale adhered to the inner wall (20 cm×20 cm) near the gas-liquid interface was collected with a bronze spatula and vacuum dried at 40° C. for 12 hours, and the weight of the scale was shown as the deposition A ($g/m^2$) of the scale. Subsequently, the next charge was fed to the reactor by the above operation, and a scale after 5 batches was collected by the above method and shown as the deposition B ($g/m^2$) of the scale.
(Emulsion Polymerization)

25 kg of ion exchange water, 75 g of sodium lauryl sulfate and 4 g of potassium persulfate were fed to a polymerization reactor (inner wall made from stainless steel) and then 12 kg of vinyl chloride monomer was fed to the reactor. Emulsion polymerization was carried out at 70° C. under agitation with Faudora blades at 900 rpm for 8 hours. After polymerization, a polymer and a water medium were taken out and the reactor was washed with water softly.

This operation was considered as one batch and the next charge was then fed to the reactor to carry out polymerization continuously. After three batches, a scale adhered to the inner wall (20 cm×20 cm) near the gas-liquid interface was collected with a bronze spatula and vacuum dried at 40° C. for 12 hours, and the weight of the scale was shown as the deposition C ($g/m^2$) of the scale. Subsequently, the next charge was fed to the reactor by the above operation, and a scale after five batches was collected by the above method and shown as the deposition D ($g/m^2$) of the scale.
(2) Coloration of Molded Product of Vinyl Chloride-based Polymer 2 parts by weight of tribasic lead sulfate, 1.5 parts by weight of zinc stearate, 0.5 part by weight of calcium stearate and 0.2 part by weight of stearic acid were mixed with 100 parts by weight of the above polyvinyl chloride obtained by suspension polymerization by the plastomill of Toyo Seiki Co., Ltd. at 185° C. for 15 minutes, and the resulting mixture was thermally pressed at 175° C. for 10 minutes to obtain a 5 mm-thick sheet. The brightness index (L value) of the sheet was measured by the Z-Σ80 color difference meter of Nippon Denshoku Kogyo Co., Ltd. The larger the L value the higher the whiteness becomes (excellent in coloration resistance).
(3) Colored Foreign Substance Contained in Molded Product of Vinyl Chloride-based Polymer 4 parts by weight of dibutyltin maleate was added to 100 parts by weight of the above polyvinyl chloride obtained by suspension polymerization and the resulting mixture was molded from the T die of a 20 mm-diameter single-screw extruder (185° C.) to form a sheet having a width of about 70 mm and a thickness of about 0.2 mm. The number of colored foreign substances contained in 100 m of this sheet was counted visually.

Reference symbols in the columns of 1-naphthol, phenol and aldehyde in Table 1 and Table 4 represent the following compounds.
A1: 1-naphthol, A2: 1,6-dihydroxynaphthalene, A3: 1,3-dihydroxynaphthalene, B1: pyrogallol, B2: catechol, B3: resorcinol, B4: 2-methylresorcinol, B5: p-butylphenol, B6: carbolic acid, B7: o-hydroxybiphenyl, B8: o-cresol, B9: hydroquinone, B10: m-chlorophenol, B11: 2-hydroxybenzoic acid, B12: p-aminophenol, C1: 37 wt % formaldehyde, C2: 90 wt % acetaldehyde, C3: benzaldehyde, Na: sodium hydroxide, K: potassium hydroxide, HCl: 36% hydrochloric acid, P: phosphoric acid Example 1

25 g of 1-naphthol, 10 g of pyrogallol, 7 g of sodium hydroxide and 300 g of distilled water were fed to a 500 ml closed glass vessel equipped with a cooling capacitor. After the inside of the vessel was substituted by nitrogen, the resulting mixture was heated at 70° C. in a hot bath under agitation. Thereafter, 20 g of a 37 wt % aqueous solution of formaldehyde was added slowly under agitation. A condensation reaction was carried out under agitation for 5 hours by maintaining that temperature. A yellowish transparent aqueous solution was obtained.

An alkaline aqueous solution of the above condensation product was adjusted to a concentration of 0.5 wt % and applied to the inner wall (stainless steel) of a reactor for polymerizing vinyl chloride having an inner capacity of about 50 liters by a steam ejector spray.

Thereafter, the reactor was washed with water to obtain a polymerization reactor having a film formed on the inner wall. The thickness of the formed film estimated from the difference between the weight of the condensate input into the polymerization reactor and the weight of the condensate output as waste water was about 0.2 g/m².

A scale adhesion prevention test was made on the obtained polymerization reactor, and coloration and colored foreign substance tests were made on a molded product of the obtained vinyl chloride-based polymer.

According to the results of the above tests, the deposition A of the scale adhesion preventing agent was 3 g/m², the deposition B was 10 g/m², the deposition C was 5 g/m², the deposition D was 14 g/m², the brightness index was L=73 and the number of colored foreign substances was 2. The conditions for producing the scale adhesion preventing agent are shown in Table 1 and Table 2 and the results obtained by using the scale adhesion preventing agent are shown in Table 3.

Examples 2 to 16

Polymerization reactors having a film formed on the inner wall were obtained in the same manner as in Example 1 except that the types and amounts of the 1-naphthol, phenol and aldehyde were changed as shown in Table 1 and the condensation conditions were changed as shown in Table 2. The weights of the formed films are shown in Table 2. A scale adhesion prevention test was made on the obtained polymerization reactors, and coloration and colored foreign substance tests were made on molded products of the obtained vinyl chloride-based polymers. The results of the above tests are shown in Table 3.

Since a condensate obtained by using an acid catalyst is solid, it was dissolved in an alkali aqueous solution before use.

TABLE 1

| | 1-naphthol | | | phenol | | | aldehyde | | | catalyst | | distilled water |
|---|---|---|---|---|---|---|---|---|---|---|---|---|
| | type | g | molar ratio | type | g | molar ratio[1] | type | g | molar ratio[2] | type | g | g |
| Ex. 1 | A1 | 25 | 1 | B1 | 10 | 0.46 | C1 | 20 | 0.98 | Na | 7 | 300 |
| Ex. 2 | A1 | 25 | 1 | B2 | 10 | 0.52 | C1 | 13 | 0.61 | Na | 7 | 300 |
| Ex. 3 | A1 | 25 | 1 | B3 | 5 | 0.26 | C1 | 18 | 1.02 | Na | 7 | 300 |
| Ex. 4 | A1 | 25 | 1 | B4 | 2 | 0.09 | C1 | 16 | 1.04 | Na | 8 | 300 |
| Ex. 5 | A2 | 25 | 1 | B5 | 9 | 0.38 | C1 | 14 | 0.80 | Na | 9 | 300 |
| Ex. 6 | A1 | 21 | 1 | B6 | 7 | 0.56 | C1 | 16 | 0.96 | K | 12 | 300 |
| Ex. 7 | A1 | 25 | 1 | B7 | 9 | 0.31 | C1 | 15 | 0.82 | K | 10 | 300 |
| Ex. 8 | A1 | 25 | 1 | B8 | 5 | 0.27 | C1 | 20 | 0.98 | Na | 7 | 300 |
| | | | | B5 | 5 | 0.19 | | | | | | |
| Ex. 9 | A1 | 25 | 1 | B3 | 9 | 0.47 | C1 | 20 | 0.97 | HCL | 50 | 300 |
| Ex. 10 | A1 | 25 | 1 | B3 | 9 | 0.47 | C1 | 20 | 0.97 | P | 50 | 300 |
| Ex. 11 | A3 | 25 | 1 | B1 | 9 | 0.46 | C1 | 8 | 0.43 | Na | 9 | 300 |
| | | | | | | | C3 | 12 | 0.50 | | | |
| Ex. 12 | A1 | 22 | 1 | B4 | 3 | 0.16 | C1 | 8 | 0.56 | Na | 7 | 300 |
| | | | | | | | C2 | 5 | 0.58 | | | |
| Ex. 13 | A1 | 22 | 1 | B8 | 5 | 0.34 | C1 | 8 | 0.50 | Na | 7 | 300 |
| | | | | | | | C2 | 5 | 0.51 | | | |
| Ex. 14 | A1 | 25 | 1 | B1 | 5 | 0.23 | C2 | 8 | 0.77 | Na | 7 | 300 |
| Ex. 15 | A1 | 22 | 1 | B3 | 8 | 0.48 | C2 | 9 | 0.82 | Na | 7 | 300 |
| Ex. 16 | A1 | 22 | 1 | B4 | 5 | 0.26 | C2 | 10 | 1.06 | HCL | 50 | 300 |

Ex.: Example
Note
[1] the number of mols of phenol based on 1 mol of 1-naphthol
Note
[2] the number of mols of aldehyde based on 1 mol of the total of 1-naphthol and phenol

TABLE 2

| | Initial temperature ° C. | final temperature ° C. | temperature elevation rate ° C./min | reaction temperature ° C. | reaction time Hr | weight of film (polymerization reactor used for suspension polymerization) g/m² |
|---|---|---|---|---|---|---|
| Ex. 1 | — | — | — | 70 | 5 | 0.2 |
| Ex. 2 | — | — | — | 75 | 5 | 0.1 |
| Ex. 3 | — | — | — | 70 | 6 | 0.1 |
| Ex. 4 | — | — | — | 70 | 5 | 0.1 |
| Ex. 5 | — | — | — | 75 | 5 | 0.1 |

TABLE 2-continued

|  | Initial temperature °C. | final temperature °C. | temperature elevation rate °C./min | reaction temperature °C. | reaction time Hr | weight of film (polymerization reactor used for suspension polymerization) g/m² |
|---|---|---|---|---|---|---|
| Ex. 6 | — | — | — | 70 | 5 | 0.1 |
| Ex. 7 | — | — | — | 75 | 5 | 0.1 |
| Ex. 8 | — | — | — | 75 | 7 | 0.2 |
| Ex. 9 | — | — | — | 75 | 5 | 0.2 |
| Ex. 10 | — | — | — | 75 | 7 | 0.3 |
| Ex. 11 | — | — | — | 75 | 6 | 0.1 |
| Ex. 12 | — | — | — | 75 | 5 | 0.1 |
| Ex. 13 | — | — | — | 75 | 5 | 0.1 |
| Ex. 14 | — | — | — | 75 | 5 | 0.2 |
| Ex. 15 | — | — | — | 75 | 5 | 0.2 |
| Ex. 16 | — | — | — | 75 | 6 | 0.2 |

Ex.: Example

TABLE 3

| | Test results | | | | | |
|---|---|---|---|---|---|---|
| | Scale adhesion prevention (g/m²) | | | | | number of |
| | deposition A | deposition B | deposition C | deposition D | brightness index (L value) | colored foreign substances |
| Ex. 1 | 3 | 10 | 5 | 14 | 73 | 2 |
| Ex. 2 | 1 | 8 | 2 | 12 | 73 | 0 |
| Ex. 3 | 1 | 8 | 2 | 15 | 73 | 2 |
| Ex. 4 | 1 | 8 | 4 | 12 | 73 | 3 |
| Ex. 5 | 3 | 13 | 3 | 15 | 73 | 4 |
| Ex. 6 | 4 | 14 | 5 | 15 | 73 | 2 |
| Ex. 7 | 3 | 11 | 4 | 12 | 73 | 3 |
| Ex. 8 | 2 | 9 | 5 | 10 | 73 | 5 |
| Ex. 9 | 1 | 13 | 7 | 14 | 73 | 3 |
| Ex. 10 | 1 | 15 | 7 | 16 | 73 | 2 |
| Ex. 11 | 3 | 10 | 6 | 14 | 73 | 2 |
| Ex. 12 | 2 | 8 | 5 | 11 | 73 | 1 |
| Ex. 13 | 4 | 9 | 5 | 10 | 73 | 1 |
| Ex. 14 | 2 | 10 | 6 | 13 | 73 | 0 |
| Ex. 15 | 2 | 14 | 5 | 15 | 73 | 0 |
| Ex. 16 | 2 | 8 | 7 | 10 | 73 | 0 |

Ex.: Example

Example 17

25 g of 1-naphthol, 10 g of catechol, 7 g of sodium hydroxide and 300 g of distilled water were fed to a 500 ml closed pressure vessel equipped with a cooling capacitor. The inside of the vessel was substituted by nitrogen gas and then heated at 70° C. in a hot bath under agitation. Thereafter, 13 g of a 37 wt % aqueous solution of formaldehyde was added slowly under agitation while that temperature was maintained.

The temperature of the reaction solution was then elevated to 100° C. at a rate of 0.7° C./min under agitation and a condensation reaction was carried out at that temperature under agitation for 5 hours. As a result, a yellowish transparent aqueous solution of a scale adhesion preventing agent was obtained.

The alkaline aqueous solution containing the above condensation product was adjusted to a concentration of 0.5 wt % and applied to the inner wall (stainless steel) of a reactor for polymerizing vinyl chloride having an inner capacity of 50 liters by a steam ejector spray. Thereafter, the reactor was washed with water to obtain a polymerization reactor having a film formed on the inner wall.

The weight of the formed film estimated from the difference between the weight of the condensate input into the polymerization reactor and the weight of the condensate output as waste water was about 0.1 g/m².

A scale adhesion prevention test was made on the obtained polymerization reactor, and coloration and colored foreign substance tests were made on a molded product of the obtained vinyl chloride-based polymer.

According to the results of the above tests, the deposition A of the scale adhesion preventing agent was 1 g/m², the deposition B was 2 g/m², the deposition C was 1 g/m², the deposition D was 3 g/m², the coloration was L=73 and the number of colored foreign substances was 0. The conditions for producing the scale adhesion preventing agent are shown in Table 4 and Table 5 and the results obtained by using the scale adhesion preventing agent are shown in Table 6.

Examples 18 to 23

Condensates and polymerization reactors having a film formed on the inner wall were obtained by using the same types and amounts of the 1-naphthol, phenol and aldehyde as in Example 17 in the same manner as in Example 17 except that condensation conditions were changed as shown in Table 5. The weights of the formed films are shown in Table 5.

A scale adhesion prevention test was made on the obtained polymerization reactors, and coloration and colored foreign substance tests were made on molded products of the obtained vinyl chloride-based polymers.

The results of the above tests are shown in Table 6.

Examples 24 to 38

Condensates and polymerization reactors having a film formed on the inner wall were obtained in the same manner as in Example 17 except that the types and amounts of the 1-naphthol, phenol and aldehyde were changed as shown in Table 4. The weights of the formed films are shown in Table 5.

A scale adhesion prevention test was made on the obtained polymerization reactors, and coloration and colored foreign substance tests were made on molded products of the obtained vinyl chloride-based polymers.

The results of the above tests are shown in Table 6.

Comparative Example 1

A polymerization reactor having a film formed on the inner wall was obtained in the same manner as in Example 1 except that the phenol was not added and the amounts of 1-naphthol and formaldehyde were changed as shown in Table 4. The weight of the formed film is shown in Table 5. A scale adhesion prevention test was made on the obtained polymerization reactor, and coloration and colored foreign substance tests were made on a molded product of the obtained vinyl chloride-based polymer. The results of the above tests are shown in Table 6.

Comparative Example 2

A polymerization reactor having a film formed on the inner wall was obtained in the same manner as in Example 1 except that 2-hydroxybenzoic acid was used as the phenol. The weight of the formed film is shown in Table 5. A scale adhesion prevention test was made on the obtained polymerization reactor, and coloration and colored foreign substance tests were made on a molded product of the obtained vinyl chloride-based polymer. The results of the above tests are shown in Table 6.

Example 39

25 g of 1-naphthol, 10 g of catechol, 7 g of sodium hydroxide and 300 g of distilled water were fed to a 500 ml closed pressure vessel equipped with a cooling capacitor. The inside of the vessel was substituted by nitrogen gas and then heated at 100° C. in a hot bath under agitation. Thereafter, 13 g of a 37 wt % aqueous solution of formaldehyde was added slowly under agitation while that temperature was maintained. A condensation reaction was carried out at that temperature under agitation for 5 hours.

As a result, a yellowish transparent aqueous solution of a scale adhesion preventing agent was obtained. An alkaline aqueous solution containing the above condensation product was adjusted to a concentration of 0.5 wt % and applied to the inner wall (stainless steel) of a reactor for polymerizing vinyl chloride having an inner capacity of about 50 liters by a steam ejector spray. Thereafter, the reactor was washed with water to obtain a polymerization reactor having a film formed on the inner wall. The weigh of the formed film is shown in Table 5. A scale adhesion prevention test was made on the obtained polymerization reactor, and coloration and colored foreign substance tests were made on a molded product of the obtained vinyl chloride-based polymer. The results of the above tests are shown in Table 6.

Example 40

A polymerization reactor having a film formed on the inner wall was obtained in the same manner as in Example 17 except that condensation conditions were changed as shown in Table 5. The weight of the formed film is shown in Table 5.

A scale adhesion prevention test was made on the obtained polymerization reactor, and coloration and colored foreign substance tests were made on a molded product of the obtained vinyl chloride-based polymer. The results of the above tests are shown in Table 6.

Comparative Example 3

A polymerization reactor having a film formed on the inner wall was obtained in the same manner as in Example 17 except that p-aminophenol was used as the phenol. The amount of the formed film is shown in Table 5. A scale adhesion prevention test was made on the obtained polymerization reactor, and coloration and colored foreign substance tests were made on a molded product of the obtained vinyl chloride-based polymer. The results of the above tests are shown in Table 6.

TABLE 4

| | 1-naphthol | | | phenol | | | aldehyde | | | catalyst | | distilled water |
|---|---|---|---|---|---|---|---|---|---|---|---|---|
| | type | g | molar ratio | type | g | molar ratio[1] | type | g | molar ratio[2] | type | g | g |
| Ex. 17 | A1 | 25 | 1 | B2 | 10 | 0.52 | C1 | 13 | 0.61 | Na | 7 | 300 |
| Ex. 18 | A1 | 25 | 1 | B2 | 10 | 0.52 | C1 | 13 | 0.61 | Na | 7 | 300 |
| Ex. 19 | A1 | 25 | 1 | B2 | 10 | 0.52 | C1 | 13 | 0.61 | Na | 7 | 300 |
| Ex. 20 | A1 | 25 | 1 | B2 | 10 | 0.52 | C1 | 13 | 0.61 | Na | 7 | 300 |
| Ex. 21 | A1 | 25 | 1 | B2 | 10 | 0.52 | C1 | 13 | 0.61 | Na | 7 | 300 |
| Ex. 22 | A1 | 25 | 1 | B2 | 10 | 0.52 | C1 | 13 | 0.61 | Na | 7 | 300 |
| Ex. 23 | A1 | 25 | 1 | B2 | 10 | 0.52 | C1 | 13 | 0.61 | Na | 7 | 300 |
| Ex. 24 | A1 | 25 | 1 | B2 | 6 | 0.31 | C1 | 13 | 0.7 | Na | 7 | 300 |
| Ex. 25 | A1 | 25 | 1 | B2 | 15 | 0.79 | C1 | 25 | 0.99 | Na | 7 | 300 |
| Ex. 26 | A1 | 25 | 1 | B2 | 2 | 0.10 | C1 | 10 | 0.65 | Na | 7 | 300 |
| Ex. 27 | A1 | 25 | 1 | B2 | 0.5 | 0.03 | C1 | 9 | 0.62 | Na | 7 | 300 |
| Ex. 28 | A2 | 25 | 1 | B2 | 10 | 0.58 | C2 | 7 | 0.58 | Na | 7 | 300 |
| Ex. 29 | A3 | 25 | 1 | B2 | 10 | 0.58 | C3 | 15 | 0.57 | Na | 7 | 300 |
| Ex. 30 | A1 | 25 | 1 | B2 | 10 | 0.52 | C2 | 7 | 0.54 | Na | 7 | 300 |
| Ex. 31 | A1 | 22 | 1 | B3 | 8 | 0.48 | C2 | 9 | 0.81 | Na | 7 | 300 |
| Ex. 32 | A1 | 25 | 1 | B9 | 10 | 0.52 | C1 | 7 | 0.33 | Na | 7 | 300 |
| Ex. 33 | A1 | 25 | 1 | B1 | 10 | 0.46 | C1 | 20 | 0.97 | Na | 6 | 300 |
| Ex. 34 | A1 | 25 | 1 | B8 | 10 | 0.53 | C1 | 13 | 0.60 | Na | 7 | 300 |
| Ex. 35 | A1 | 25 | 1 | B5 | 10 | 0.38 | C1 | 13 | 0.67 | Na | 7 | 300 |
| Ex. 36 | A1 | 25 | 1 | B7 | 10 | 0.34 | C1 | 13 | 0.69 | Na | 7 | 300 |
| Ex. 37 | A1 | 25 | 1 | B4 | 10 | 0.47 | C1 | 13 | 0.64 | Na | 7 | 300 |
| Ex. 38 | A1 | 25 | 1 | B10 | 10 | 0.45 | C1 | 13 | 0.64 | Na | 7 | 300 |
| C. Ex. 1 | A1 | 31 | 1 | — | — | — | C1 | 17 | 0.98 | Na | 7 | 300 |
| C. Ex. 2 | A1 | 25 | 1 | B11 | 10 | 0.42 | C1 | 20 | 1.00 | Na | 7 | 300 |
| Ex. 39 | A1 | 25 | 1 | B2 | 10 | 0.52 | C1 | 13 | 0.61 | Na | 7 | 300 |
| Ex. 40 | A1 | 25 | 1 | B2 | 10 | 0.52 | C1 | 13 | 0.61 | Na | 7 | 300 |
| C. Ex. 3 | A1 | 25 | 1 | B12 | 10 | 0.52 | C1 | 13 | 0.61 | Na | 7 | 300 |

Ex.: Example
C. Ex.: Comparative Example
Note
[1] the number of mols of phenol based on 1 mol of 1-naphthol
Note
[2] the number of mols of aldehyde based on 1 mol of the total of 1-naphthol and phenol

TABLE 5

| | Initial temperature °C. | final temperature °C. | temperature elevation rate °C./min | reaction temperature °C. | reaction time Hr | weight of film (polymerization reactor used for suspension polymerization) g/m² |
|---|---|---|---|---|---|---|
| Ex. 17 | 70 | 100 | 0.7 | 100 | 5 | 0.1 |
| Ex. 18 | 66 | 108 | 0.9 | 108 | 5 | 0.1 |
| Ex. 19 | 74 | 100 | 0.3 | 100 | 5 | 0.1 |
| Ex. 20 | 61 | 100 | 0.7 | 100 | 5 | 0.1 |
| Ex. 21 | 70 | 115 | 0.7 | 115 | 5 | 0.1 |
| Ex. 22 | 50 | 100 | 0.7 | 100 | 5 | 0.2 |
| Ex. 23 | 78 | 145 | 0.5 | 145 | 5 | 0.1 |
| Ex. 24 | 70 | 100 | 0.7 | 100 | 5 | 0.1 |
| Ex. 25 | 70 | 100 | 0.7 | 100 | 5 | 0.1 |
| Ex. 26 | 70 | 100 | 0.7 | 100 | 5 | 0.2 |
| Ex. 27 | 70 | 100 | 0.7 | 100 | 5 | 0.2 |
| Ex. 28 | 70 | 100 | 0.7 | 100 | 5 | 0.1 |
| Ex. 29 | 70 | 100 | 0.7 | 100 | 5 | 0.1 |
| Ex. 30 | 70 | 100 | 0.7 | 100 | 5 | 0.1 |
| Ex. 31 | 70 | 100 | 0.7 | 100 | 5 | 0.2 |
| Ex. 32 | 70 | 100 | 0.7 | 100 | 5 | 0.2 |
| Ex. 33 | 70 | 100 | 0.7 | 100 | 5 | 0.2 |
| Ex. 34 | 70 | 100 | 0.7 | 100 | 5 | 0.1 |
| Ex. 35 | 70 | 100 | 0.7 | 100 | 5 | 0.1 |
| Ex. 36 | 70 | 100 | 0.7 | 100 | 5 | 0.1 |
| Ex. 37 | 70 | 100 | 0.7 | 100 | 5 | 0.1 |
| Ex. 38 | 70 | 100 | 0.7 | 100 | 5 | 0.1 |
| C. Ex. 1 | — | — | — | 70 | 5 | 0.1 |
| C. Ex. 2 | — | — | — | 70 | 5 | 0.2 |
| Ex. 39 | — | — | — | 100 | 5 | 0.2 |
| Ex. 40 | 70 | 100 | 3.0 | 100 | 5 | 0.2 |
| C. Ex. 3 | 70 | 100 | 0.7 | 100 | 5 | 0.2 |

Ex.: Example
C. Ex.: Comparative Example

TABLE 6

| | Test results | | | | | |
|---|---|---|---|---|---|---|
| | Scale adhesion prevention (g/m²) | | | | brightness index (L value) | number of colored foreign substances |
| | deposition A | deposition B | deposition C | deposition D | | |
| Ex. 17 | 1 | 2 | 1 | 3 | 73 | 0 |
| Ex. 18 | 1 | 2 | 2 | 3 | 73 | 0 |
| Ex. 19 | 1 | 3 | 1 | 3 | 73 | 0 |
| Ex. 20 | 2 | 4 | 3 | 4 | 73 | 0 |
| Ex. 21 | 3 | 5 | 4 | 6 | 73 | 0 |
| Ex. 22 | 3 | 9 | 5 | 11 | 73 | 0 |
| Ex. 23 | 5 | 10 | 4 | 12 | 73 | 1 |
| Ex. 24 | 2 | 4 | 2 | 4 | 73 | 0 |
| Ex. 25 | 1 | 3 | 2 | 5 | 73 | 1 |
| Ex. 26 | 2 | 5 | 4 | 8 | 73 | 0 |
| Ex. 27 | 4 | 7 | 5 | 10 | 73 | 0 |
| Ex. 28 | 2 | 4 | 4 | 7 | 73 | 0 |
| Ex. 29 | 3 | 4 | 4 | 6 | 73 | 1 |
| Ex. 30 | 2 | 3 | 3 | 5 | 73 | 0 |
| Ex. 31 | 1 | 12 | 1 | 14 | 73 | 1 |
| Ex. 32 | 1 | 3 | 3 | 8 | 73 | 1 |
| Ex. 33 | 2 | 9 | 4 | 12 | 73 | 0 |
| Ex. 34 | 3 | 5 | 5 | 8 | 73 | 0 |
| Ex. 35 | 2 | 4 | 2 | 6 | 73 | 0 |
| Ex. 36 | 2 | 4 | 3 | 6 | 73 | 0 |
| Ex. 37 | 1 | 5 | 3 | 5 | 73 | 0 |
| Ex. 38 | 2 | 7 | 6 | 8 | 73 | 0 |
| C. Ex. 1 | 4 | 21 | 8 | 25 | 73 | 24 |
| C. Ex. 2 | 10 | 25 | 11 | 36 | 70 | 25 |
| Ex. 39 | 5 | 19 | 5 | 35 | 73 | 2 |
| Ex. 40 | 10 | 16 | 15 | 41 | 72 | 7 |
| C. Ex. 3 | 9 | 23 | 11 | 29 | 68 | 18 |

Ex.: Example
C. Ex.: Comparative Example

What is claimed is:

1. A scale adhesion preventing agent for use in a polymerization reactor, comprising, as a main component, a condensate of a phenol represented by the following formula (1), a 1-naphthol and an aldehyde, which is soluble in an alkaline aqueous solution:

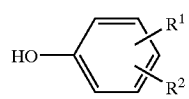

(1)

wherein $R^1$ and $R^2$ are the same or different and each a hydroxyl group, alkyl group having 1 to 8 carbon atoms, halogen atom, hydrogen atom, alkoxycarbonyl group whose alkyl moiety has 1 to 8 carbon atoms or phenyl group, with the proviso that hydrogen atoms are existent at at least two positions of ortho-positions and para-position with respect to the hydroxyl group.

2. The scale adhesion preventing agent of claim 1, wherein the condensate is obtained by carrying out condensation using 1 mol of a 1-naphthol, 0.01 to 2 mols of a phenol based on 1 mol of a 1-naphthol and 0.2 to 2 mols of an aldehyde based on 1 mol of the total amount of the 1-naphthol and the phenol.

3. A process for producing a scale adhesion preventing agent for use in a polymerization reactor, comprising the step of condensing a phenol represented by the following formula (1), a 1-naphthol and an aldehyde in an aqueous solvent to form a product comprising, as a main component, a condensate soluble in an alkaline aqueous solution:

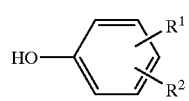

(1)

wherein $R^1$ and $R^2$ are the same or different and each a hydroxyl group, alkyl group having 1 to 8 carbon atoms, halogen atom, hydrogen atom, alkoxycarbonyl group whose alkyl moiety has 1 to 8 carbon atoms or phenyl group, with the proviso that hydrogen atoms are existent at at least two positions of ortho-positions and para-position with respect to the hydroxyl group.

4. The process of claim 3, comprising the steps of mixing a phenol represented by the following formula (1), a 1-nahthol, an aldehyde and a basic catalyst into an aqueous solvent at a temperature of 80° C. or less and raising the temperature to 90 to 150° C. at a rate of 2° C./min or less to carry out a condensation reaction:

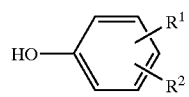

(1)

wherein $R^1$ and $R^2$ are the same or different and each a hydroxyl group, alkyl group having 1 to 8 carbon atoms, halogen atom, hydrogen atom, alkoxycarbonyl group whose alkyl moiety has 1 to 8 carbon atoms or phenyl group, with the proviso that hydrogen atoms are existent at at least two positions of ortho-positions and para-position with respect to the hydroxyl group.

5. A scale adhesion preventing agent for use in a vinyl monomer polymerization reactor, comprising, as a main component, a condensate of catechol, 1-naphthol and at least one aldehyde selected from the group consisting of formaldehyde and acetaldehyde.

6. A scale adhesion preventing agent for use in a vinyl chloride polymerization reactor, comprising, as a main component, a condensate of catechol, 1-naphthol and formaldehyde.

7. A polymerization reactor having a film of the scale adhesion preventing agent of any one of claims 1, 2, 5 and 6 on an inner wall of the polymerization reactor.

8. A process for producing a vinyl polymer, comprising polymerizing a vinyl monomer using the polymerization reactor of claim 7.

* * * * *